Feb. 28, 1939.                C. F. LORENZ                 2,148,482
            ELECTRICAL DEVICE AND METHOD OF OPERATING THE SAME
                         Filed Jan. 10, 1934            2 Sheets-Sheet 1
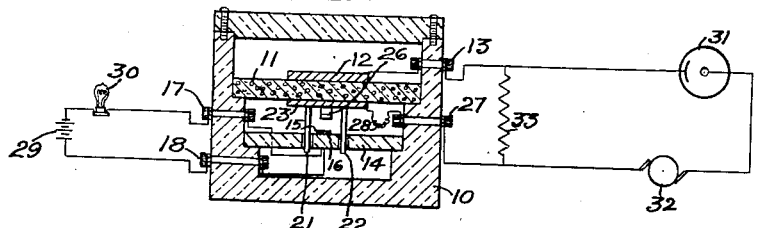
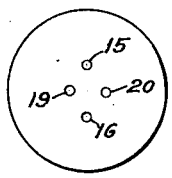 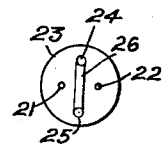 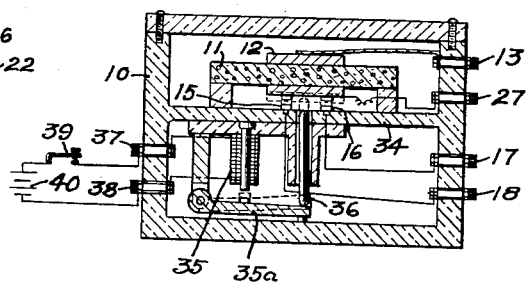
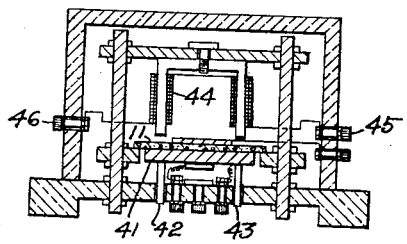 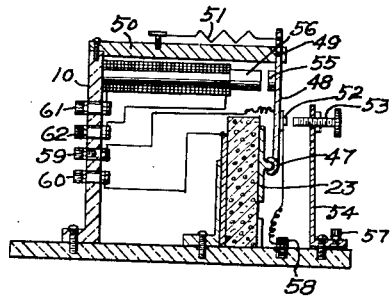
INVENTOR
*Charles Frederick Lorenz*
BY
*H. R. Van Deventer*
ATTORNEY Feb. 28, 1939. C. F. LORENZ 2,148,482
ELECTRICAL DEVICE AND METHOD OF OPERATING THE SAME
Filed Jan. 10, 1934 2 Sheets-Sheet 2
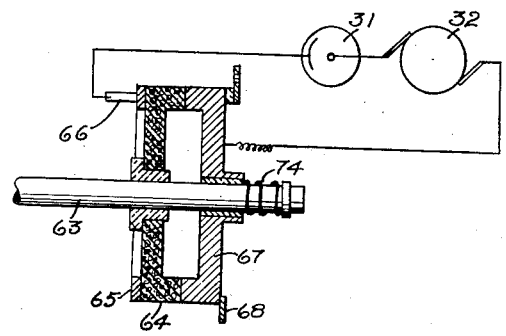
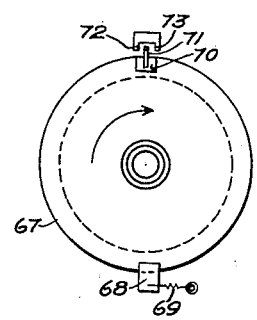
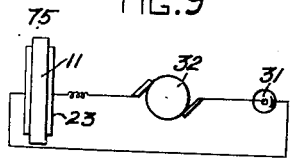
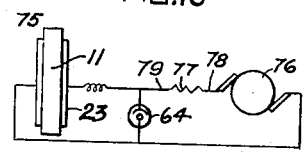
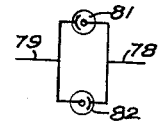
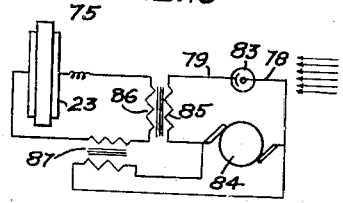
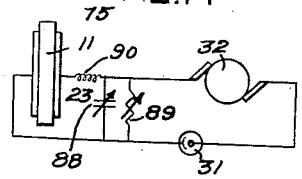
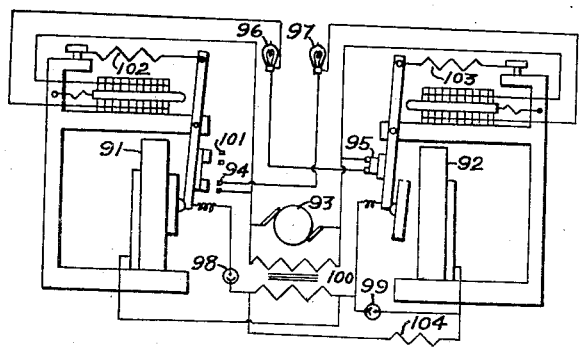
INVENTOR
Charles Frederick Lorenz
BY
ATTORNEY Patented Feb. 28, 1939

2,148,482

UNITED STATES PATENT OFFICE 2,148,482

ELECTRICAL DEVICE AND METHOD OF OPERATING THE SAME

Charles Frederick Lorenz, East Orange, N. J.

Application January 10, 1934, Serial No. 706,014

8 Claims. (Cl. 250—41.5)

This invention relates to improvements in electrical devices and method of operating the same, and more particularly to a device utilizing electro-adhesion and adapted for use with actuating means utilizing radiant energy, in accordance with the method herein set forth.

The device may be used for many purposes, and one of the objects of the invention is to provide an improved form of electrical device employing the attractive force known as electro-adhesion.

Another object is to provide an improved method of operating electro-adhesion devices by means of radiant energy.

A further object is to provide an improved form of electrical relay operating on the electro-adhesion principle which is simple and cheap to construct, and which has an improved means for resetting.

Other objects will be apparent from the following specification, in which, by way of illustration, is described an electrical device comprising a relay which may be used for a variety of purposes, to which is connected a circuit containing instrumentalities suitable for carrying out the improved method and operation herein described and claimed.

In the accompanying drawings, where by way of illustration several modifications of an electrical device are shown:

Figure 1 is a vertical sectional view of an electrical device, a relay, embodying the invention, together with a circuit illustrating the method of operating the same;

Figure 2 is a top view of the member 14 shown in section in Figure 1;

Figure 3 is a bottom view of the armature 23 shown in section in Figure 1;

Figure 4 is a vertical sectional view of a relay embodying the invention and provided with electromagnetic resetting means;

Figure 5 is a vertical sectional view of an alternate form of the relay shown in Figure 4;

Figure 6 is a vertical sectional view of an alternate form of the relay shown in Figure 4 and showing a ball-and-socket connection between its armature and the support therefor;

Figure 7 is a vertical sectional view of a relay that does not require electromagnetic means as shown in Figures 4 to 6 inclusive, for resetting the same;

Figure 8 is a detail view of the armature 65 of the relay shown in Figure 7;

Figures 9 to 13 are circuits for carrying out the method of operating the electrical devices shown in Figures 1 to 8 inclusive;

Figure 14 is a circuit for controlling the time interval in which the relays, Figures 1 to 8, operate; and Figure 15 is a diagram showing two relays arranged to reset each other.

All of the relays herein shown utilize electro-adhesion, their construction being such that for functioning they require but a minute current and consequently but little electrical power. The voltage of the operating circuit may be a few hundred volts and in some cases may be as low as 100 volts or less. The small power required in the energizing circuit for operating these relays makes them suited for use (for example) in conjunction with light-sensitive cells or other radiant energy devices, and by their use changes in illumination or the emission of other radiant energy, moderate or even minute in amount, can control directly, without the use of an amplifier, a current of several amperes at ordinary voltages in the work circuit controlled by the relay.

Electro-adhesion is the attractive force which exists between the surface of a semi-conductor and the surface of a conductor when the two are in intimate contact and a difference of potential exists between the conductor and the region in the partial conductor at or very near its surface, a small current flowing at the same time from the one to the other.

The great sensitiveness to light changes shown by the combination of an electro-adhesion relay with a suitable photo-cell is in part attained by a suitable design of the relay itself, including suitable choice of the magnitude of the area of contact between the partially conducting piece and the conducting element, and in part by the peculiar functioning of the combination when a suitable cell is suitably placed in circuit with the relay as hereinafter described.

Any suitable material may be used for the semi-conducting member hereinafter described in detail. A preferred material is lithographic stone (which is a porous variety of calcium carbonate) or jasper, but any other suitable material having a high specific electrical resistance and of such a nature as to be capable of being accurately surfaced, can be used.

In Figure 1, the numeral 10 denotes a suitable framework or casing (which may be of box-like form to include all the working parts) in or upon which is supported in any suitable manner the fixed semi-conducting member 11 preferably of lithographic stone, having secured thereto the plate 12 adapted to conduct current thereto. This is electrically connected to terminal 13.

A suitable member 14 of insulating material is fixed to framework 10 and carries contacts 15, 16 connected to terminals 17, 18. This member is shown in detail in Figure 2 and is provided with holes 19, 20, which are large enough to act as guides for the pins 21, 22, secured to the movable conducting member (hereinafter termed "armature") 23.

The armature 23, Figure 3, may be of metal and may in itself act to bridge the contacts 15, 16, but is preferably provided with the resilient contacts 24, 25, mounted on a cross spring 26 to ensure a yielding contact when the member 23 is down with its contacts to bridge the contacts 15, 16. The spring 26 is insulated from member 23 in any suitable manner and circuit terminal 27 is connected to the spring 26 in any suitable manner such as via flexible conductor 28 adapted to conduct current thereto while permitting the movement thereof.

Figure 1 shows the relay with the work circuit open. Current is flowing in the energizing circuit connected to terminals 13, 27 and the members 11 and 23 are held in contact by electro-adhesion as previously described and the contacts 15, 16, 24, 25 are open. Should the energizing circuit be cut off or the current therein be varied within certain limits determined by the adjustment of the relay, the members 11 and 23 will separate and armature 23 will fall by gravity, thereby causing contacts 24, 25 to bridge contacts 15, 16 and close the work circuit connected to terminals 17, 18, thereby causing current to flow from the source of current 29 to the lamp 30 which will light.

The energizing circuit may be of any suitable character to furnish current to actuate the relay, and includes the photo-cell 31, the current supply 32 and the resistance 33 connected as shown.

After the armature 23 is dropped by the means just described, it is necessary to restore or reset same to the position shown in Figure 1. This may be done by inverting the relay whereupon 23 will drop against the adjacent surface of 11 and adhere there, assuming that current is flowing in the energizing circuit.

Figure 4 shows a relay operating as above described but with electrical means for resetting the armature 23. Here the framework 10 has a cross-member 34 upon which the members 11 and 23 are mounted in any suitable manner. The contacts 15, 16 are mounted on 34 as shown, and an electro-magnet mechanism generally denoted by the numeral 35 is mounted below the member 34 and has an armature 35a having its outer end engaging a rod 36 as shown. The magnets of the mechanism 35 are connected via terminals 37, 38 to a push button 39 and source of current 40 in the resetting circuit.

When the armature 23 is released from 11, the button 39 is pressed, the mechanism 35 is energized and the rod 36 pushes the armature 23 from the position shown in dotted lines, Figure 4 to the position shown in solid lines, where it is in contact with 11 and again ready for operation.

An alternate means of resetting the relay is shown in Figure 5 wherein the armature member 41 is of magnetic material and has the downwardly projecting pins 42, 43 projecting through base 10. The armature 42 is attracted upwards by the poles of an electro-magnet 44 connected to the resetting circuit via terminals 45, 46. The operation of this modification is the same as the device shown in Figure 4 and is obvious from a study of the figure.

In the relays shown in Figures 1, 4 and 5, the force opposing the adhesion is in each case gravity. Obviously, the force of a spring as shown in Figure 6 may be used in the constructions shown in Figures 1, 4 and 5 instead of gravity and the magnitude of the spring force may be adjustable in any suitable manner. As such constructions as applied to Figures 1, 4 and 5 are obvious, they are not described in detail.

Figure 6 shows another form of construction in which the armature 23 is mounted on a ball and socket 47 so that it can swivel in any direction so as to fit evenly against the adjacent surface of the fixed member 11. The arm 48 supports the armature 23 in operative relationship to the other parts and this arm is pivoted at 49 on the support 50 secured to the framework 10. A retractile spring 51 holds the arm 48 and the armature 23 away from 11. A contact 52 is insulatedly mounted on arm 48 and when the relay is in the non-energized position this contacts with the adjustable contact 53 in support 54. The arm 48 is provided with an armature 55 adapted to be attracted by the magnet 56 to reset the relay as described in connection with the preceding figures. The work circuit connects to terminals 57, 58 and the energizing circuit to 59, 60, the resetting circuit connected to terminals 61, 62.

Figure 7 shows a form of relay not requiring auxiliary means for resetting, that is, the movements of the movable member actuating the contacts follow the successive alternate illuminations and non-illuminations of the photo-cell.

A shaft 63 is rotated by any suitable means and insulatedly mounted upon this shaft is the fixed semi-conducting member 64 provided with a slip ring 65 against which bears a contact brush 66 connected to one side of the energizing circuit, including the photo-cell 31 and a suitable voltage supply 32. Mounted upon shaft 63 is the armature 67 which may take the form of a disk, as more fully shown in Figure 8, said disk having secured thereto a lug 68 to which is attached a spring 69 adapted to restrain the disk contrary to the direction of the rotation of the shaft 63. The disk is provided with an insulating block 70 carrying the contact arm 71 adapted to make contact when the relay is in the non-operating position with the contact 72. When the relay is energized by the illumination of the photo-cell 31 in the energizing circuit, the electro-adhesion takes place between disks 64 and 67 and disk 67 tends to revolve against the tension of spring 69, thereby closing contacts 70 and 71 and opening the circuit through contact 72.

The work circuit may be connected to contacts 71, 72, 73. A spring 74 is positioned about the shaft and bears against the disk 67 with sufficient tension to always place it in position against disk 64, ready to operate, but this spring does not have sufficient tension to interfere when the electro-adhesion action takes place to prevent disk 67 from operating as just described.

Figures 9 to 13, inclusive, indicate ways of connecting the previously described relays (generally denoted by the numeral 75 in these figures) in circuit with photo-cells.

The circuit shown in Figure 9 is that of Figure 1 repeated, with the omission of the leak resistance 33. There is always some leakage between the armature 23 and the partial conductor 11 and this may in some cases be sufficient for the dissipation of the residual charge as hereinafter referred to.

The circuit of Figure 10, in which the photo-cell 76 shunts the relay 75, is better than that of Figure 9 in cases when the relay resistance, always high, is extremely high, and may also be useful in other cases. The resistance 77 connected to points 78, 79 in the circuit, is for giving a voltage drop when the photo-cell is illuminated. This resistance may advantageously be replaced by some other current-limiting means. One such is shown in Figure 11, namely a vacuum photo-cell 80 constantly illuminated. In case an alternating current source is used, this should be replaced by a pair of vacuum photo-cells in parallel, reversed with respect to each other and constantly illuminated, as shown at 81, 82, in Figure 12.

In Figure 13 is shown a light-sensitive cell 83 connected in series with an alternating current source 84, and the primary 85 of a transformer, the secondary 86 of which is connected to the terminals of the relay 75. In this case, the light sensitive element may be a selenium cell connected as in Figure 11 or it may be a vacuum or gas-filled cell, or it may consist of two of the latter connected in parallel but reversed with respect to each other, as shown in Figure 12, or it may consist of a photo-cell with two photo-active surfaces.

A source of voltage may be provided in series with the secondary of the transformer and the relay. This voltage may be given by the secondary of another transformer 87 which has its primary fed from the same alternating current source that is in series with the primary 85, so that a constant phase-relation is maintained between the two induced alternating electro-motive forces.

Figure 14 shows means of controlling the time interval or lag which elapses between the instant the illumination of the photo-cell is cut off and the instant at which the metal plate leaves the semi-conductor. The photo-cell 31 and the relay 75 are in series with a voltage source 32 (which may be alternating current or direct current). In parallel with the photo-cell is an adjustable condenser 88 (of very small capacity) and a resistor 89 (of very high resistance). The capacity of the condenser is additive to the capacity of the relay itself and the leak through the resistor is additive to the natural leak in the relay itself. By adjustment of this capacity and the resistance, the time interval between the cutting off of illumination and the letting go of the armature 23 of the relay may be adjusted to a desired period of time, which may be a fraction of a second or as much as several minutes.

For long desired intervals the external leak resistor 89 may be omitted. By adjustment of the force pulling the plate away from the semi-conductor (as by adjustment of the force of the spring 90) further control of the time interval in question is obtained. This applies of course when the relay is controlled not by a photo-cell but by making and breaking the energizing circuit by any means such as a switch.

The combination just described finds a direct application as a burglar alarm. For this purpose the adjustment of capacity 88, leak-resistance 89 and removal force (spring 51) is made so as to obtain quick response of the relay. In some cases the external capacity and leak resistance are not needed, the partial-conductor—conductor combination having in itself just the right capacity and leak.

Figure 15 shows how an "on and off" action can be obtained by using two relays each actuating the resetting means of the other and employing two photo-cells which are actuated in unison.

The relays may be of any suitable construction and are generally indicated in Figure 15 by the numerals 91 and 92.

A suitable source of current such as the generator 93 is connected to the resetting solenoids which are in series with the contacts 94, 95. Suitable resistances having a high temperature coefficient, such as gas filled lamps, are inserted at 96 and 97 in the resetting circuits.

Photo-cells 98, 99 are provided connected via transformer 100 to the source of current 93. It will be observed that photo-cell 98 is in series with relay 91 and that photo-cell 99 shunts the relay 92. It will be understood that the photo-cells operate together, that is, they are illuminated or darkened together. One of the relays, for example, 91, can be provided with the extra set of contacts 101 adapted to be closed when the relay is operated.

In operation, when the photo-cell 98 is dark, the relay 91 will release its armature, which being pulled outward by the retractile spring 102, closes the contacts 94 in the resetting circuit of relay 92 and also closes the contacts 101 to the work circuit. This causes current to flow through the resetting mechanism of relay 92, thereby resetting the relay and opening contacts 95. The current through the resetting mechanism of relay 92 also passes through the lamp 97. As this lamp heats up, its resistance increases, decreasing the current until the spring on the solenoid armature overcomes the magnetic effect and draws the armature back in the core.

Photo-cell 99 being dark, no current flows through it. The closing of relay 92 causes an energizing current to flow, holding the armature in position. The resistor 104 is used in a manner similar to the resistor 77 shown in Figure 10. When the light comes back on the photo-cell 99 shunts the relay 92, causing the energizing current through relay 92 to get smaller and smaller until spring 103 pulls the relay 92 out to the position shown in the figure, thereby closing the contacts 95 that in turn energize the resetting circuit of relay 91.

The relays being connected as shown in any of the drawings, if light shines on the photo-cell in the energizing circuit, a current will flow and a difference of potential will exist between the semi-conductor, for example 11, in Figure 1 and the conducting element or armature 23 and there will be electro-adhesion between them. For the sake of brevity, the semi-conductor and the armature are hereafter termed an "electro-adhesion pair" and it will be understood that either member of the pair may be movable.

Since a photo-cell passes current only in one direction, the effect of it in the energizing circuit is cumulative, that is, a charge is built up in the condenser system constituting the electro-adhesion pair, the surface of the armature acting as one coating of a condenser, while a thin layer-like region of the semi-conductor acts as a dielectric and the immediate adjacent region of the semi-conductor acts as the other coating of a condenser. The effect of this cumulative action is to raise the sensitiveness of the combination to changes in the strength of the beam of light, that is to say, a weaker beam shining steadily on the photo-cell will suffice to maintain a given force of adhesion than if the cumulative action did not exist.

If the photo-cell is replaced by an ohmic resistor of impedance equivalent to that of the cell in the direction of conductivity, then the voltage between the elements of the electro-adhesion pair will be that of the voltage source diminished by the drop in the ohmic resistor, whereas when the photo-cell is employed the voltage builds up to the full line voltage.

If an A. C. voltage supply is used, there will be a similar building up of voltage difference between the elements of the electro-adhesion pair because a photo-cell acts as a rectifier; hence the great sensitiveness of the electrical device when operated in accordance with this method, it being possible to secure sufficient adhesive force to perform useful work with a very small strength of light beam.

It will be evident from the foregoing that the type of photo-cell suitable to carry out this method is that in which light or other radiant energy produces electronic emission, but obviously any form of radiant energy emitter that will give blocking action against the flow of current in one direction may be used provided the device is capable of being operated with relatively high voltages across its terminals without breakdown.

It will be obvious from the foregoing that some types of photo-cells are not suitable for carrying out the method herein disclosed for the reason that the photo-cell must be suited to prevent flow of the charge backward through the electrical device or relay itself, so that the voltage between the electro-adhesion pair or elements thereof builds up to a value approaching the full peak voltage in the case of A. C. supply. The relay might be said to resemble a condenser shunted by a resistance connected through a rectifier to a current supply, with the difference that in connection with the method herein described the radiation striking the photo-tube controls the rate of charge-up and with the further difference that the condenser responds mechanically when the lag reduces the charge thereof to a certain value.

It will be evident from the foregoing that provision has been made to control the lag in the operation of the device due to the gradual disappearance of the adhesion force when the light is cut off from the cell.

What is claimed is:

1. In a device of the character described, electro-adhesion members adapted to be actuated by the application of current thereto, one of which comprises a movable armature of magnetic material, and magnetic means independent of said members for moving said armature.

2. In a device of the character described, electro-adhesion members, one of which constitutes a movable armature, a support for said armature, and a universal joint between said support and armature.

3. In a device of the character described, a rotatable semi-conducting member, a movable armature supported adjacent said conductor and constituting therewith an electro-adhesion pair, and contacts controlled by the movement of said armature.

4. In a device of the character described, a fixed semi-conducting member, a member of conducting material adapted to contact therewith, an energizing circuit connected to said members including a source of current whereby said members are normally held in contact by electro-adhesion, electrical means for varying the energy flowing in said circuit to cause said members to separate, and contact members adapted to be actuated by the separation of said member of conducting material from said fixed semi-conducting member.

5. An electrical device comprising a framework, an electro-adhesion pair supported thereby, said pair consisting of fixed and movable members, and circuit controlling means operated by said movable member when same is released from electro-adhesion with said fixed member.

6. In a device of the character described, an electro-adhesion pair consisting of fixed and movable members, and a contact resiliently supported on said movable member and adapted to be moved when said last member is released from electro-adhesion with said fixed member.

7. In a device of the character described, a fixed and a movable member constituting an electro-adesion pair, said movable member being magnetic, and magnetic means independent of said fixed member for moving said movable member.

8. A circuit serially including a radiant energy emitter, a source of current connected to said emitter to energize the same and an electro-adhesion pair, one member of which is capable of motion controlled by the operation of said emitter.

CHARLES FREDERICK LORENZ.